4 Sheets—Sheet 3.

A. G. HILL.
BEE-HIVE.

No. 186,562. Patented Jan. 23, 1877.

Witnesses:
P. C. Dieterich.
Frank H. Duffy.

Inventor:
Alanson G. Hill,
per: C. H. Watson & Co. Attorneys.

N. PETERS, PHOTO-LITHOGRAPHER, WASHINGTON, D.C.

4 Sheets—Sheet 4.

A. G. HILL.
BEE-HIVE.

No. 186,562.  Patented Jan. 23, 1877.

Witnesses:
P. C. Dieterich
Frank H. Duffy

Inventor:
Alanson G. Hill.
Per: C. H. Watson & Co. Attorneys.

UNITED STATES PATENT OFFICE.

ALANSON G. HILL, OF KENDALLVILLE, INDIANA.

IMPROVEMENT IN BEE-HIVES.

Specification forming part of Letters Patent No. 186,562, dated January 23, 1877; application filed October 27, 1876.

*To all whom it may concern:*

Be it known that I, ALANSON G. HILL, of Kendallville, in the county of Noble and State of Indiana, have invented certain new and useful Improvements in Bee-Hive; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to bee-hives; and it consists in a bee-hive having the body and cap, the same being adapted to receive suitable means for the bees to build the comb, and all arranged whereby the cap incloses and protects the parts in transportation. It also consists in a honey-box for bee-hives, in which the top and sides are formed of continuous pieces of wood grooved transversely on the outside at suitable distances apart, for the purpose of easily dividing the same, all as hereinafter more fully set forth.

Figure 1:
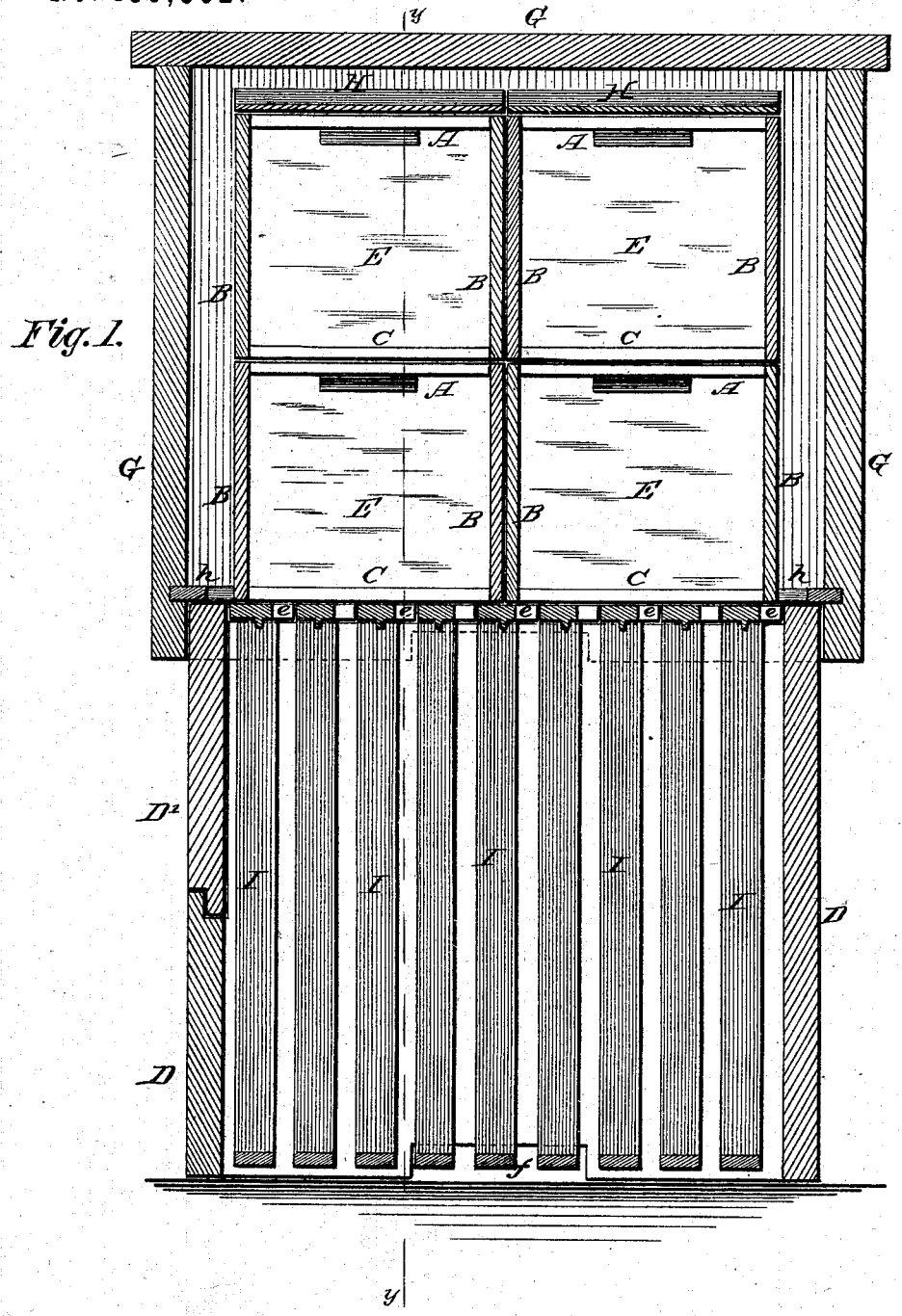
Figure 2:
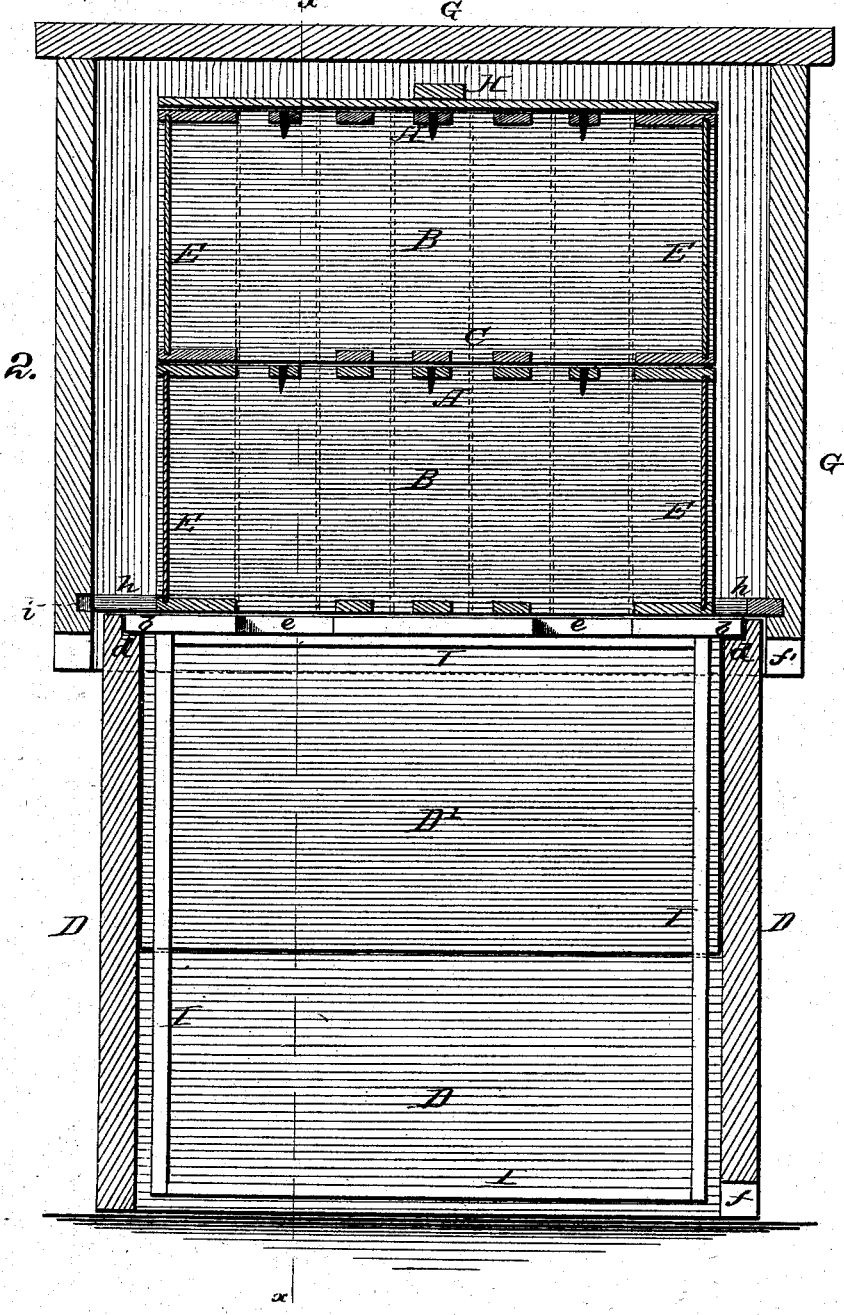
Figure 3:
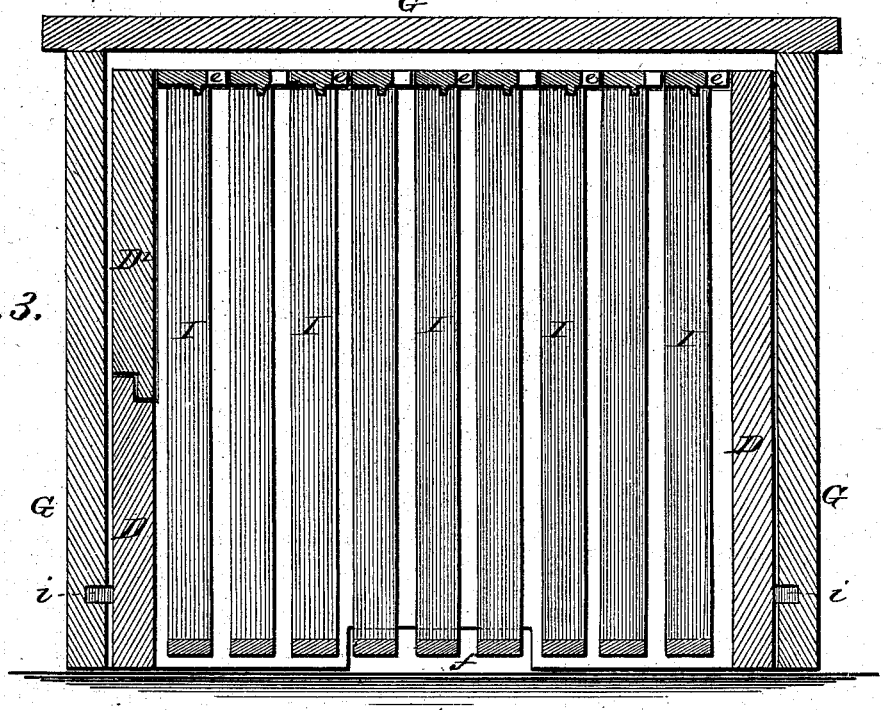
Figure 4:
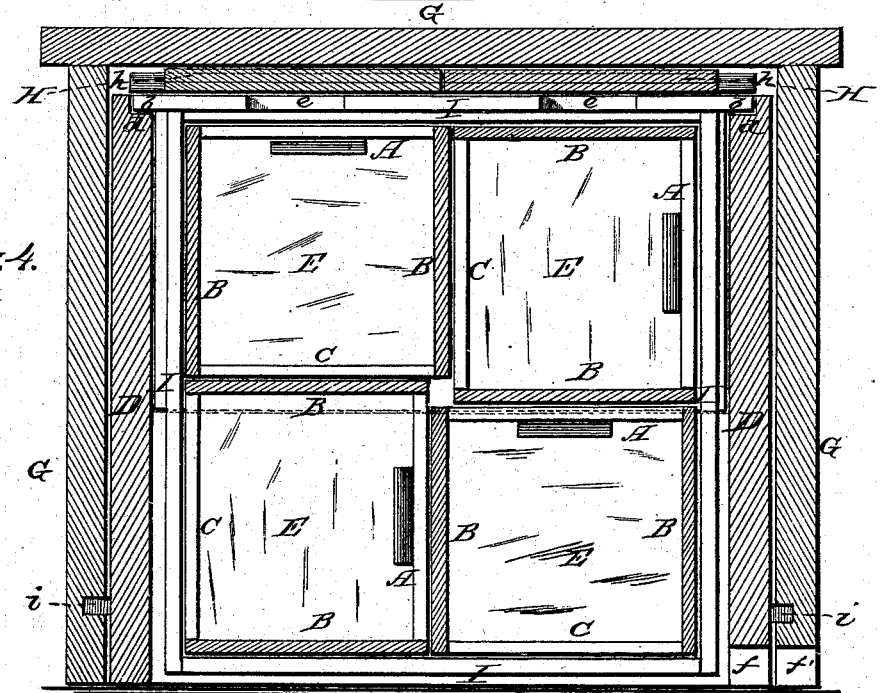
Figure 5:
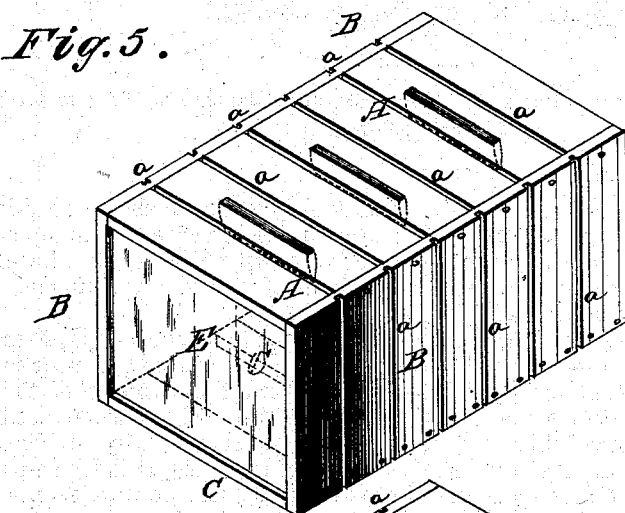
Figure 6:
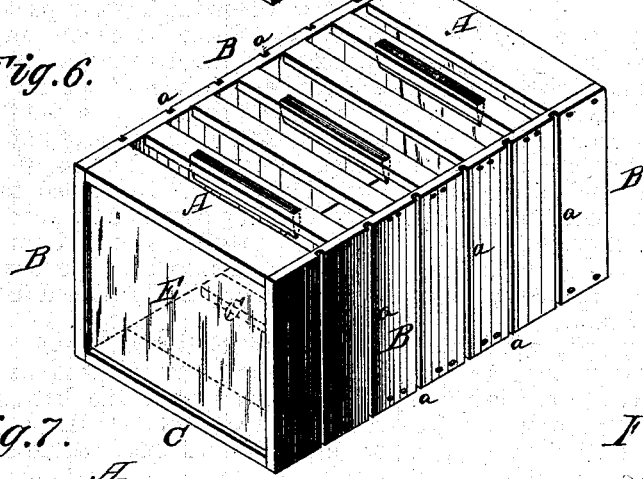
Figure 7:
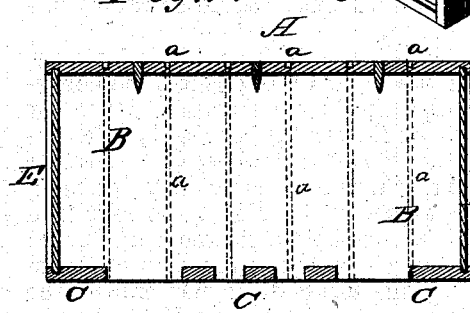
Figure 8:
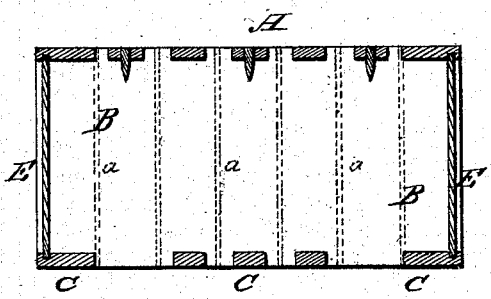

In the annexed drawings, Figures 1 and 2 are vertical sections, showing my bee-hive arranged as a summer hive. Fig. 3 is a vertical section, showing it arranged as a winter hive. Fig. 4 is a similar section, showing it arranged for transportation. Figs. 5 and 6 are perspective views of the honey-box; and Figs. 7 and 8 are longitudinal vertical sections of the same.

D represents the body of the bee-hive, formed at its upper edge on opposite sides with shoulders or offsets $d$ to receive the protecting ends $b$ of the top bars of the comb-frames I I, which are thus suspended thereon. The top bars of these frames are formed with suitable openings $e$, which serve as passages for the bees in summer when passing from the brood-chamber to the honey-chamber. In winter-time these openings are covered by means of dividing-boards H. In the bottom edge of the hive-body D is the bee-entrance $f$. G represents the cap of the hive constructed of such size that it will fit over and completely inclose the body D either for transportation or when used as a winter hive. In the latter case the entire hive is thus provided with double walls, as shown in Fig. 3. The cap has in its lower edge an opening, $f'$, to correspond with the regular bee-entrance $f$, and admit of the passage in and out of the bees.

On the inside of the cap G, near the lower edges, are grooves $i$ for the insertion of cleats $h$, which form the support of the cap upon the top of the body D when used as a summer hive, as shown fully in Figs. 1 and 2. One side of the body D is formed with a rabbeted door, D', for the admission of the honey-boxes when the hive is packed for transportation. These boxes are formed of tops A and sides B B, as shown. These tops and sides are each made of one continuous piece of wood, and grooves $a\,a$ are cut transversely across their side or sides at any suitable distances apart. The bottom of each box is formed of slats C C fastened to the sides B B, and leaving openings between them for the passage of the bees to and from the brood-chamber. The ends of the box are formed by glass plates E E fastened in any suitable manner.

The object of the transverse grooves $a\,a$ of the honey-box is to render it easy to split the sections apart after the box is filled, and thereby enable the retailer to split up the large boxes to suit his customers without cutting the honey.

When the hive is to be packed for transportation the door D' is opened, the honey-boxes placed within the frames I I, the door D' closed again, when the boards H and cleats $h$ are laid on top of the frames, and the cap G placed over the whole, completely inclosing the same, as shown in Fig. 4, the hive then taking up but one-half of the room, and hence effect that much saving in the cost of transportation. The cleats $h$ do not extend the entire distance into the corners of the box or outer case, but are left short, so that when removed and packed for transportation, they can be packed within the outer case, as shown in Fig. 4, so that the entire parts can be packed within the outer case for transportation.

I am aware that the insides of honey-boxes have been heretofore provided with grooves, so that the box may be separated when filled with honey; this, however, is impractical, as in cutting the same apart, the grooves cannot be seen. To remedy this difficulty I form my grooves on the outside, where they can be easily seen, and followed by the knife when desired to be cut apart.

Having thus fully described my invention, what I claim as new, and desire to secure by Letters Patent, is—

1. The bee-hive consisting of the body D, cap G, comb frames I, honey-boxes E, and the short cleats $h'$, all constructed and arranged whereby it forms a summer and winter hive, and the entire parts can be inclosed within the case G, as represented in Fig. 4, for transportation, substantially as and for the purpose set forth.

2. A honey-box for bee-hives having its top and sides provided on the outside with transverse grooves, for the purposes herein set forth.

In testimony that I claim the foregoing as my own I affix my signature in presence of two witnesses.

ALANSON G. HILL.

Witnesses:
 WM. B. UPPERMAN,
 C. H. WATSON.